United States Patent
Chi et al.

(10) Patent No.: US 10,366,150 B2
(45) Date of Patent: Jul. 30, 2019

(54) GENERATING A SECTION OF A DIGITAL MAGAZINE INCLUDING CONTENT FROM ONE OR MORE USERS

(71) Applicant: Flipboard, Inc., Palo Alto, CA (US)

(72) Inventors: Sang Chi, Burlingame, CA (US); Jason Culverhouse, Redwood City, CA (US)

(73) Assignee: Flipboard, Inc., Palo Alto, CA (US)

( * ) Notice: Subject to any disclaimer, the term of this patent is extended or adjusted under 35 U.S.C. 154(b) by 255 days.

(21) Appl. No.: 14/493,325

(22) Filed: Sep. 22, 2014

(65) Prior Publication Data
US 2016/0085729 A1   Mar. 24, 2016

(51) Int. Cl.
*G06F 3/00* (2006.01)
*G06F 17/24* (2006.01)
*H04L 12/18* (2006.01)
*H04L 12/58* (2006.01)

(52) U.S. Cl.
CPC .......... *G06F 17/24* (2013.01); *H04L 12/1822* (2013.01); *H04L 51/32* (2013.01)

(58) Field of Classification Search
CPC ...... G06F 17/24; H04L 12/1822; H04L 51/32
See application file for complete search history.

(56) References Cited

U.S. PATENT DOCUMENTS

| | | | |
|---|---|---|---|
| 8,612,851 B2 * | 12/2013 | Kiefer, III | G06Q 30/02 715/204 |
| 8,788,487 B2 | 7/2014 | Stout et al. | |
| 2010/0306249 A1 | 12/2010 | Hill et al. | |
| 2014/0067825 A1 | 3/2014 | Oztaskent et al. | |
| 2014/0075296 A1 | 3/2014 | Schaad et al. | |
| 2015/0095268 A1 * | 4/2015 | Greenzeiger | G06Q 10/00 706/11 |
| 2015/0222672 A1 * | 8/2015 | Vaughn | H04L 65/403 709/204 |
| 2015/0334168 A1 * | 11/2015 | Kosslyn | H04L 67/10 709/204 |
| 2015/0348111 A1 * | 12/2015 | Davis | G06Q 30/0264 705/14.61 |

* cited by examiner

*Primary Examiner* — Kyle R Stork
(74) *Attorney, Agent, or Firm* — Fenwick & West LLP

(57) ABSTRACT

A digital magazine server receives a request from a user to create a section of a digital magazine including information identifying additional users authorized to modify content included in the section. For example, the request includes information identifying specific additional users or includes attributes associated with additional users. Based on information in the request, the digital magazine server identifies the additional users authorized to modify the content included in the section and notifies the additional user of their authorization to modify content included in the section. A modification to content included in the section is received from an additional user (e.g., identifying a content item, modifying content of a content item in the section), with the section generated based at least in part on the received modification. When the section is presented to digital magazine server users, the additional user providing the modification is also identified.

9 Claims, 3 Drawing Sheets

GENERATING A SECTION OF A DIGITAL MAGAZINE INCLUDING CONTENT FROM ONE OR MORE USERS

BACKGROUND

This disclosure relates generally to digital magazines, and more particularly to generating a section of a digital magazine including content from one or more users.

A digital magazine server provides content to its users as a digital magazine including various sections each having content items arranged in positions relative to each other. A section may be generated or created by a user or an entity (e.g., a business). However, a section including content provided by a single user may lack depth of content about a topic or a theme of the section.

SUMMARY

A digital magazine server retrieves content from one or more sources and generates a personalized, customizable digital magazine for a user based on the retrieved content. The generated digital magazine is retrieved by a digital magazine application executing on a client device (such as a mobile communication device, tablet, computer, or any other suitable computing system) and presented to the user. For example, based on selections made by the user and/or on behalf of the user, the digital magazine application or the digital magazine server generates a digital magazine including one or more sections having content items retrieved from a number of sources and personalized for the user. The generated digital magazine allows the user to more easily consume content that interests and inspires the user by presenting content items in an easily navigable interface via a client device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

Each section of the digital magazine may be generated by a user of the digital magazine server. Additionally, sections may be generated by entities, such as businesses or organizations presenting content in the digital magazine. To increase user interaction with content items in a section of a digital magazine and increase the variety and breadth of content included in the section, a user or an entity creating the section may authorize or invite additional users to contribute content items or other information to the section, these additional users may be identified as "co-contributors" to the section.

The digital magazine server receives a request from a user to create a section of a digital magazine. The request includes content for inclusion in the section of the digital magazine and information identifying the user. Additionally, the request may include information identifying one or more additional users authorized by the user to modify content included in the section or to add additional content to the section of the digital magazine. One or more attributes associated with the user or with the one or more additional users may also be specified in the request. Example attributes of a user include a location associated with the user, other users connected to the user via the digital magazine server or via a social networking system communicating with the digital magazine server, one or more topics associated with the user, and one or more additional sections of the digital magazine with which the user has interacted.

Based on the received request, the digital magazine server identifies additional users authorized by the user to modify the section associated with the request. In one example, the digital magazine server identifies the additional users associated with identifying information, such as user names, included in the request. Alternatively, the digital magazine server identifies additional users based on one or more attributes associated with the user and specified in the request. For example, the digital magazine server identifies additional users within a threshold distance of a location specified in the request as additional users authorized to modify the section or identifies additional users connected to the user by a social networking system and associated with a topic specified in the request as authorized to modify the section.

After identifying the additional users, the digital magazine server notifies the additional users of the section and that the additional users are authorized to modify the section (e.g., modify content items in the section, include content items in the section). For example, the digital magazine server communicates a notification to an additional user identifying the section, indicating the user is authorized to modify the section, and also identifying the user authorizing the additional user to modify the section. An additional user identifies a content item for inclusion in the section to the digital magazine server, which includes the content item identified by the additional user in the section. Hence, the section includes content items identified by the user as well as by one or more additional users authorized by the user to modify the section.

When generating the section, the digital magazine server determines a format for presenting content items based on content items identified by the user and identified by the one or more additional users. In one embodiment, the digital magazine server computes scores associated with each content item based on one or more attributes associated with the content items. Based at least in part on the scores, the digital magazine server ranks the content items and selects content items having at least a threshold position in the ranking or having at least a threshold score for inclusion in the section. To generate the section, one or more page templates specifying positioning of content items relative to each other are selected by the digital magazine server. In various embodiments, a page template selected to present content items is based at least in part on positions of the content items in the ranking. When presenting the section, an identifier of a user identifying a content item is presented along with the content item, allowing the section to identify content items identified by the user or identified by an additional user. Additionally, if an additional user modifies a content item included in the section (e.g., edits or comments a content item), information identifying the additional user and the modification is presented along with the content item in the section.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
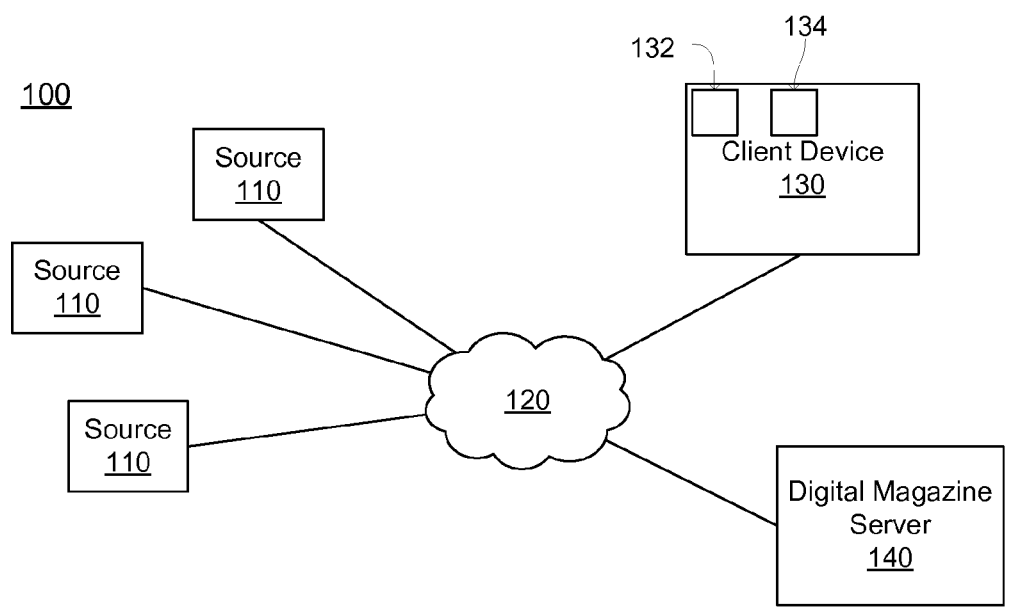
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML), JavaScript Object Notation (JSON), or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

In addition to the input devices 134 and display devices 132, the client device 130 may also include one or more position sensors determining a location of the client device 130. For example, the client device 130 includes a global positioning system (GPS) sensor that determines coordinates specifying a location associated with the client device 130. A digital magazine application executing on the client device 130 may access coordinates determined by the GPS sensor to identify the location of the client device 130, which may be associated with a user of the client device 130. In another example, a position sensor included in the client device 130 determines a location associated with the client device 130 based on characteristics of a connection between the client device 130 and the network 120. For example, the client device 130 is associated with an Internet Protocol (IP) address when it connects to the network 120. A position sensor or the digital magazine application executing on the client device 130 determines a location associated with the client device 130 from the IP address associated with the client device 130. The digital magazine application executing on the client device may communicate the location information (e.g., coordinates from the GPS sensor, a location determined from an IP address associated with the client device 130) to the digital magazine server 140, which associates the location information with a user associated with the client device 130.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
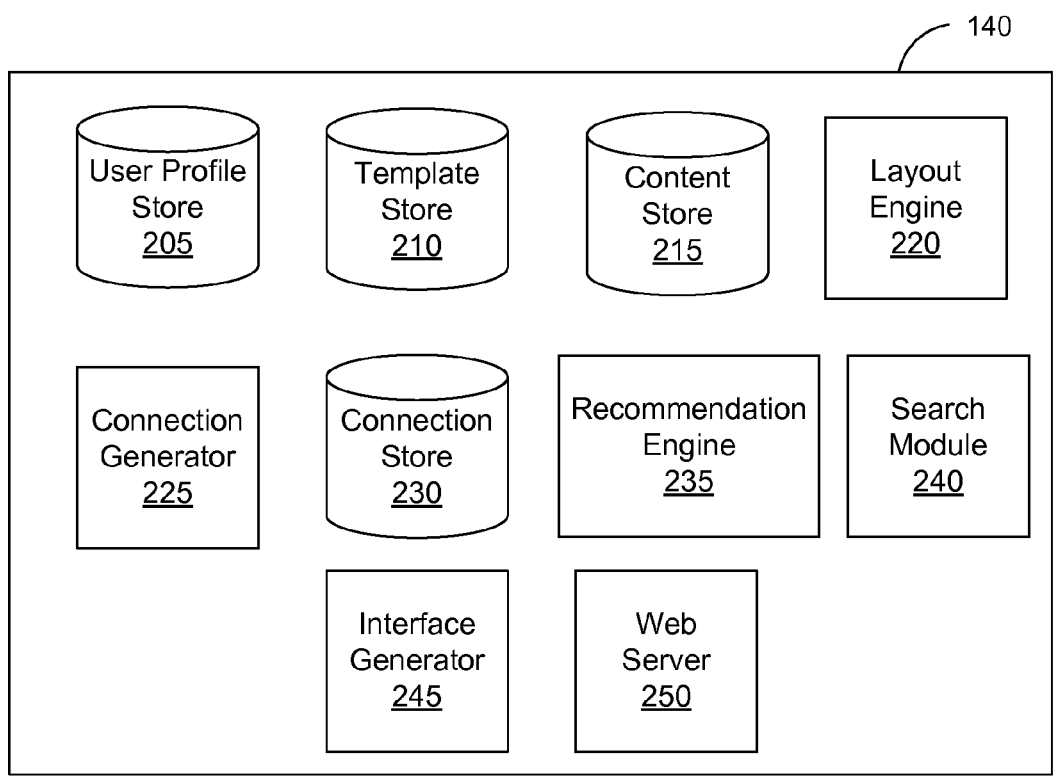
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

A user profile also includes information identifying a user associated with the user profile. For example, the user identifying information is an electronic mail address associated with the user, an identifier generated by the digital magazine server 140, a username associated with the user, or any other information uniquely identifying the user. Additional information included in the user profile includes contact information associated with the user, such as a phone number or any other suitable information. Location information may also be included in a user profile associated with the user. The location information may be received from a client device 130 associated with the user, such as information from a position sensor included in the client device 130 associated with the user. A digital magazine application executing on a client device 130 may be authorized by a user associated with the client device 130 to retrieve location information from the client device 130 and communicate the retrieved location information to the digital magazine server 140 for storage in the user's user profile. In various embodiments, a user profile may include various location information associated with a user, such as location information specifying a current location associated with the user, location information specifying a hometown of the user, and location information specifying one or more prior locations associated with the user.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140. In one example, user profiles associated with an entity include location information. For example, the user profiles associated with a business entity may include location information identifying the location of one or more stores associated with the business entity.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

The content store 215 stores objects that each represent various types of content. For example, the content store 215 stores content items received from one or more sources 130 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

In one embodiment, the layout engine 220 generates a section of the digital magazine including content items based on a request received from a user. The request includes information identifying content items for inclusion in the section and information identifying the user. Additionally, the request may include information identifying one or more additional user authorized by the user to modify content included in the section. Based on information in the request, the layout engine 220 identifies the additional and notifies the additional users of the section and that the additional users are authorized to modify content in the section. The layout engine 220 generates the section including content items identified by the user as well as by the one or more additional users, as is described with respect to FIG. 4 below. However, other components of the digital magazine server 140 may generate a section of the digital magazine. For example, the search module 240 generates a section of the digital magazine including content items identified based on a search query received from a user, as further described in U.S. patent application Ser. No. 13/961,868, filed on Aug. 7, 2013, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, JSON, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, location information associated with an additional user is provided to the digital magazine server 140 by a digital magazine application executing on a client device 130 associated with the additional user. Based on the location information, the digital magazine server 140 determines whether the additional user is authorized to modify a section of the digital magazine.

Page Templates

Figure 3:
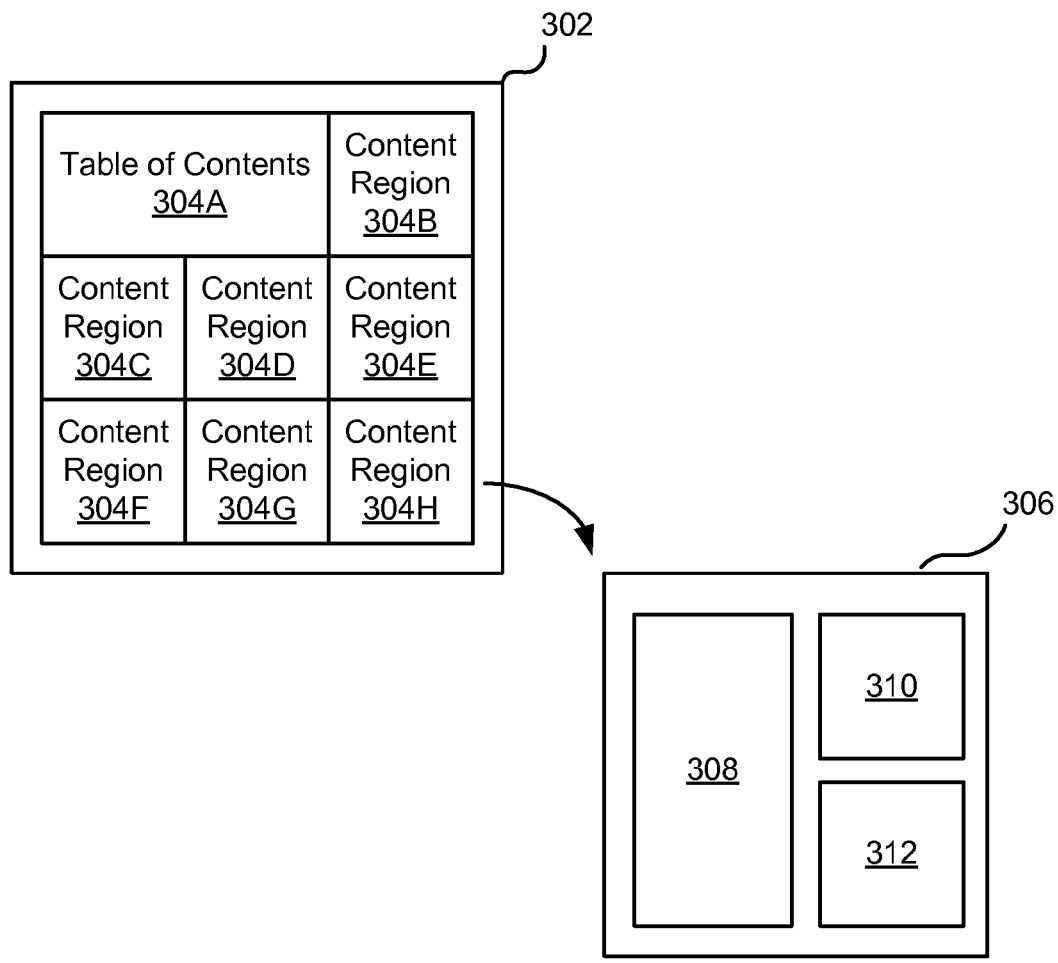
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
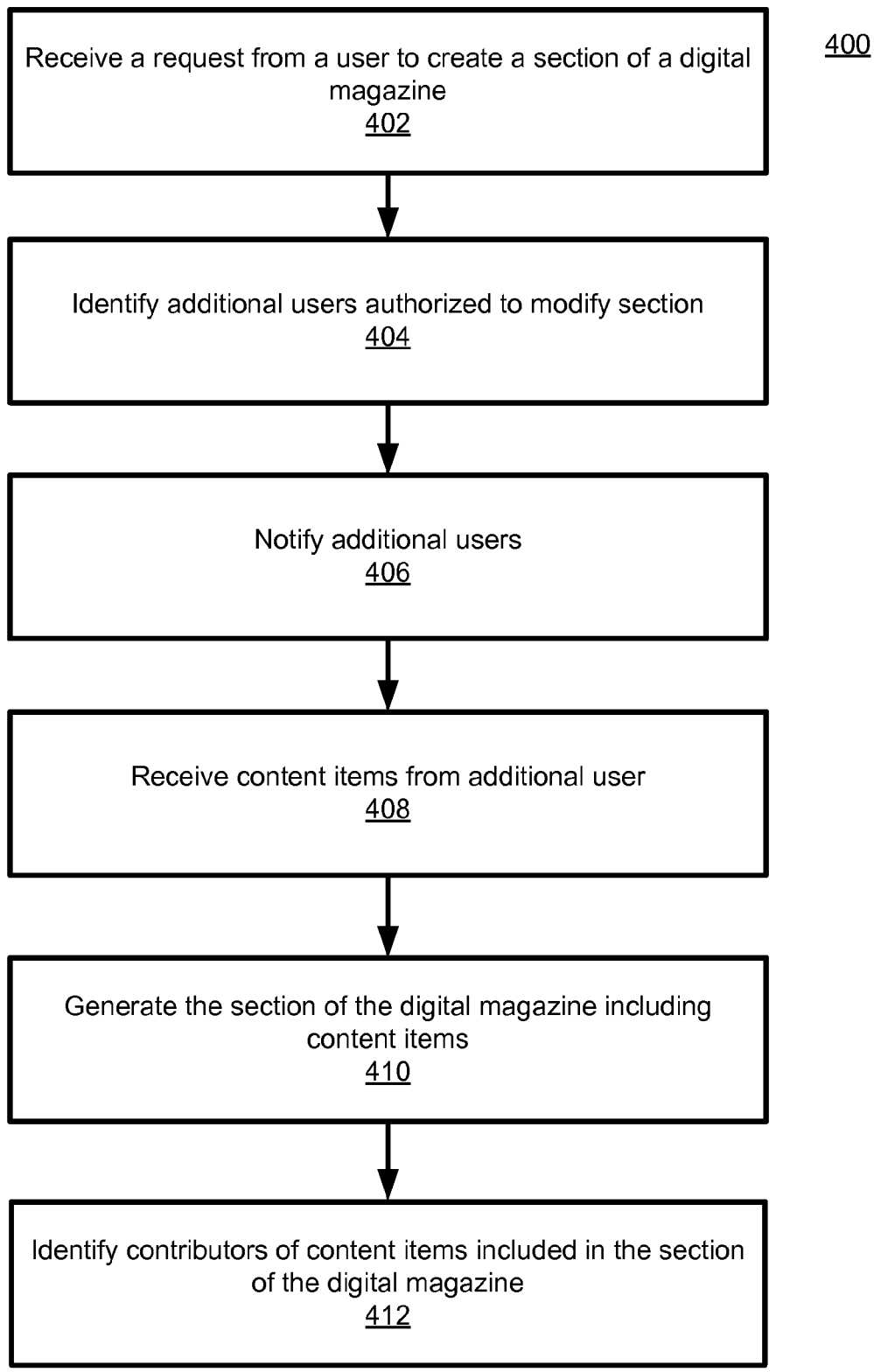
FIG. 4 illustrates a process for generating a user-defined section of a digital magazine including content items identified by one or more users, in accordance with an embodiment of the invention.

Generating a Section of a Digital Magazine Including Content from Multiple Users FIG. 4 illustrates a process for generating a user-defined section of a digital magazine including one or more authors or co-contributors. In one embodiment, the process 400 is performed by the digital magazine server 140. Alternatively, the process 400 is performed by a digital magazine application executing on a client device 130 or by a combination of the digital magazine server 140 and a digital magazine application executing on a client device 130. In some embodiments, different or additional steps than those shown in FIG. 4 may be performed. Additionally, the steps described in conjunction with FIG. 4 may be performed in different orders in some embodiments.

The digital magazine server 140 receives 402 a request from a user, which may be an individual user or an entity, via a client device 130 and the network 120 to create a section of a digital magazine. The request includes an identifier associated with the section and an identifier associated with the user (e.g., a username, an e-mail address, a user identifier, etc.). Additionally, the request may include information identifying one or more content items for inclusion in the section or may include one or more content items for inclusion in the section. For example, the request identifies one or more sources 110 from which content items for inclusion in the section are retrieved. For example, the request includes usernames of one or more users of the digital magazine server 140 as sources to include content items associated with the one or more users in the section. As another example, the request includes a network address or link to a social networking system, a blog, a news service, or other type of source 110.

In addition to identifying the section and the user, the request also includes information identifying one or more additional users authorized by the user to modify content included in the section. For example, an additional user is authorized to identify additional content items for inclusion in the section or is authorized to modify one or more content items included in the section. Various information may be used to identify the additional users or the user. Example types of information for identifying the additional users include usernames associated with the additional users by the digital magazine server 140, e-mail addresses associated with the additional users, or other identifying information associated with the additional users by the digital magazine server 140 or by another system that communicates with the digital magazine server 140.

One or more attributes associated with the user or with one or more additional users may also be included in the request. Example attributes associated with the user include: a location associated with the requesting user, information describing connections between the user and one or more other users via the digital magazine server 140 or via a social networking system, actions performed by the user and communicated to the digital magazine server 140, one or more topics associated with the user, and one or more additional sections of the digital magazine with which the user has interacted or has created. An attribute may identify a social networking system that communicates with the digital magazine server 140 and one or more types of connections between the user and other users via the social networking system. Similar attributes associated with an additional user may also be included in the request. Attributes associated with an additional user may identify the types of modifications the additional user is authorized by the user to make to content included in the section. For example, an additional user is associated with an attribute authorizing the user to add content items to the section but not to modify content items already included in the section, while another additional user is associated with a different attribute authorizing the user to modify content items included in the section but not to add other content items to the section.

In one embodiment, the user from which the digital magazine server 140 receives 402 the request to generate the section of the digital magazine is an entity, such as a business. Included in the request are attributes associated with the entity, and the digital magazine server 140 uses one or more of the attributes to identify additional users who are authorized to modify content included in the section. For example, the request includes an attribute specifying a location of a store associated with the business and a threshold distance from the location of the store. As another embodiment, the digital magazine server 140 receives 402 a request from a user to generate a section of the digital magazine including an attribute specifying other users connected to the user via a social networking system communicating with the user as additional users who are authorized to content included in the section of the digital magazine.

Based on the received request, the digital magazine server 140 identifies 404 additional users authorized to modify content included in the section. In one example, the digital magazine server 140 identifies 404 the additional users based on usernames or other user identifying information specified by the request. Alternatively, the digital magazine server 140 identifies 404 additional users based on the attributes specified in the request. For example, the digital magazine server 140 identifies 404 additional users within a threshold distance of a location specified in the request as additional users authorized to modify the section; the threshold distance may be specified in the request or be based on information associated with the user by the digital magazine server 140. To identify 404 the additional users based on a location specified in the request, the digital magazine server 140 retrieves location information associated with one or more users of the digital magazine server 140 from the user profile store 205 and identifies 404 users with location information within a threshold distance of the location specified in the received request as additional users authorized to modify content included in the section. In one example, a request received 402 from a business to generate a section includes an attribute specifying the location of a store associated with the business and a threshold distance to the store, and the digital magazine server 140 identifies 404 users with location information within the threshold distance to the location of the store as additional users authorized to modify content included in the section.

In one embodiment, the digital magazine server 140 identifies 404 the additional users as users connected to the user via the digital magazine server 140 or via a social networking system that communicates with the digital magazine server 140. If a social networking system 140 communicates with the digital magazine server 140, the digital magazine server 140 retrieves information associated with the user from the social networking system, such as other users of the social networking system connected to the user via the social networking system, via an application programming interface (API) or other interface and identifies 404 one or more of the other users connected to the user via the social networking system as additional users authorized to modify content included in the section. For example, the digital magazine server 140 identifies 404 users of the digital magazine server 140 corresponding to other users connected to the user via the social networking system as additional users authorized to modify content in the section, based on attributes included in the request.

Upon identifying the additional users, the digital magazine server 140 notifies 406 the additional users of the section and their authorization to modify content included in the section of the digital magazine. In one embodiment, a digital magazine application executing on a client device 130 associated with an additional user presents a notification to the additional user identifying the section and the modifications to content included in the section that the additional user is authorized to make (e.g., modify content items included in the section, add additional content items to the section). However, any suitable communication channel may be used to notify 406 the additional users they are authorized to modify content included in the section. For example, an additional user receives an e-mail or a text message notifying 406 the additional user of its authorization to modify content included in the section.

The digital magazine server 140 receives 408 one or more content items associated with the section from an additional user to include in the section of the digital magazine or instructions to modify a content item included in the section of the digital magazine. For example, the digital magazine server 140 receives 408 instructions from the additional user to modify a content item included in the section or receives 408 information identifying a content item for inclusion in the section via a digital magazine application executing on a client device 130 associated with the additional user. Examples of instructions to modify a content item included in the section include instructions to associate a comment with the content item or instructions to modify content included in the content item. To identify a content item for inclusion in the section, the additional user may provide the digital magazine sever 140 with information identifying the content item (e.g., a network address, a content identifier) or information identifying a source 110 associated with one or more content items (e.g., a username or user identifying information of a user of the digital magazine server 140, an identifier or network address associated with a source 110). Alternatively, the additional user may provide a content item, such as such as an image or a blog, itself for inclusion in the section.

In the preceding example where the digital magazine server 140 receives 402 a request to generate a section of the digital magazine from an entity, such as a business, and identifies 404 additional users based on a location associated with a store and a threshold distance from the location associated with the store specified by the request, the digital magazine server 140 receives 408 an image from an additional user including the additional user with an item purchased from the store. As another example, the digital magazine server 140 receives 408 a request from an additional user to modify a content item included in the section by the business, such as a request to include a comment on the content item in the section. Identifying additional users and authorizing the additional users to modify content included in a section of a digital magazine generated by a business entity allows the business entity to increase user interaction with and interest in content associated with the business entity, and also enables the business entity to increase the breadth and depth of content in the section.

Similarly, if the digital magazine server 140 receives 402 a request from a user to generate a section of the digital magazine and including an attribute specifying other users connected to the user via a social networking system communicating with the digital magazine server 140 as additional users authorized to modify content included in the section, the digital magazine server notifies 406 of their authorization to modify content included in the section, as described above. An additional user provides instructions to the digital magazine server 140 to edit content within a content item included in the section. As another example, the digital magazine server 140 receives 408 information identifying a source 110 of content items for inclusion in the section from an additional user.

Returning now to the description of the flowchart shown in FIG. 4, the digital magazine server 140 generates 410 the section of the digital magazine including content items specified by the user as well as one or more content items identified by an additional user or modified by an additional user. An example of generating 410 a digital magazine section is further described above in conjunction with FIGS. 2 and 3. To generate 410 the section of the digital magazine including one or more content items from the requesting user and the additional users, the digital magazine server 140 selects content items from content items identified by the user and by one or more additional user and determines a layout for presenting the selected content items relative to each other on a page of the digital magazine.

In one embodiment, the digital magazine server 140 computes scores for each content item identified by the requesting user or identified by an additional user based on one or more attributes associated with the content items. Examples of attributes associated with a content item include: connections between other users interacting with a content item and the user or an additional user, interactions between the user and the content item (or similar content items presented by the digital magazine server 140), geographic information associated with the content item and with the user or an additional user, and a quality indicator associated with the content item. A quality indicator provides an indication of the quality of an image associated with a content item or the number of images included in a content item, provides an indication of the number of times a keyword about a topic appears in one or more content items included in one or more selected content sources, or provides another suitable measure of expected interest in or interaction with the content item.

Based at least in part on the scores, the digital magazine server 140 ranks the content items to be included in the section. To generate 410 the section including the ranked content items, the digital magazine server 140 determines a layout for the content items by selecting one or more page templates to present content items included in the section to digital magazine server users. In one embodiment, the digital magazine server 140 dynamically arranges the selected content items relative to each other based on a page template selected from the template store 210. For example, the digital magazine server 140 assigns a content item type to selected content items. Examples of content item types include: text data, image data, video data, social networking system data, message, and audio data. The digital magazine server 140 may convert content items received from various sources 110 into a standardized format where each content item is associated with a content item type according to rules included in the layout engine 220. Based on a content item type associated with various content items, the digital magazine server 140 selects one or more page templates from the template store 210 and arranges the received content items based on the selected page templates.

The digital magazine server 140 may dynamically modify the content items in the generated section or the layout of content items presented in the generated section of the digital magazine. For example, the digital magazine server 140 may update the layout and one or more of the content items presented from the generated section of the digital magazine to allow a user to more easily explore content items from a set of sources 110. In another example, the digital magazine server 140 updates the layout of content items relative to each other in the section based on user interaction with content items in the section or updates the content items presented from the generated section based on location information associated with a client device 130 presenting the section, based on a time of day when the section is presented, or based on interactions with content items by other digital magazine server users.

In addition to generating 410 the section of the digital magazine, the digital magazine server 140 identifies 412 the requesting user and one or more of the additional users when presenting the section. For example, the digital magazine server 412 presents information identifying the user or an additional user identifying a content item in the section or presents information identifying an additional user that modified content included in a content item included in the section. Additionally, information identifying the user and one or more additional users (e.g., usernames) may be presented along with an identifier associated with the section to readily identify various users providing information used to generate the section. The digital magazine server 140 may modify a portion of the section, or of a content item included in the section, to include information such as, a name or a username, identifying 412 the user or the additional user from which the content item was received or to identify 412 an additional user modifying the content item.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a digital magazine, the method comprising:

receiving a request to create a section of the digital magazine from a user of a digital magazine server at the digital magazine server, the request including a location and a threshold distance from the location;

retrieving, at the digital magazine server, location information associated with one or more users of the digital magazine server;

identifying, by the digital magazine server, one or more users associated with location information stored by the digital magazine server within the threshold distance included in the request of the location included in the request as additional users of the digital magazine server authorized by the user to modify content included in the section of the digital magazine;

presenting an indication to each of the identified one or more additional users identifying the section of the digital magazine, identifying an authorization to modify content included in the section of the digital magazine, and identifying the user of the digital magazine server from whom the request to create the section of the digital magazine was received;

receiving a content item from an additional user of the plurality of additional users for inclusion in the section of the digital magazine;

generating the section of the digital magazine including the received content item from the additional user and one or more content items identified by the user by the digital magazine server computing scores for the one or more content items identified by the user and for the content item received from the additional user, the digital magazine server ranking the content items identified by the user and the content item received from the ranking based on the scores, the digital magazine server selecting a set of the one or more content items identified by the user and the additional content item based on the ranking, scoring page templates stored by the digital magazine server based on characteristics of slots in each of at least a set of page templates stored by the digital magazine server and characteristics of each of the set of the one or more content items identified by the user and the additional content item, selecting a page template stored by the digital magazine server specifying positions of each of the set of the one or more content items identified by the user and the additional content item relative to each other based on the scoring and the digital magazine server presenting the one or more content items and the additional content items in positions relative to each other specified by the selected page template in the section based on the ranking; and presenting the section of the digital magazine including information identifying the additional user in conjunction with the content item received from the additional user and information identifying the user as associated with the section of the digital magazine to one or more other users of the digital magazine server.

2. The method of claim 1, wherein presenting the indication to each of the identified one or more additional users identifying the section of the digital magazine and identifying an authorization to modify content included in the section of the digital magazine comprises:

sending a notification message to each of the plurality of additional users identifying the section and including information specifying the plurality of additional users are authorized to identify one or more content items to the section of the digital magazine.

3. A method for generating a digital magazine, the method comprising:

receiving a request to create a section of the digital magazine from a user of a digital magazine server at the digital magazine server, the request including a location and a threshold distance from the location;

retrieving, at the digital magazine server, stored location information associated with one or more users of the digital magazine server;

identifying, by the digital magazine server, one or more users associated with location information stored by the digital magazine server within the threshold distance included in the request of the location included in the request as additional users of the digital magazine server authorized by the user to modify content included in the section of the digital magazine;

presenting an indication to each of the one or more additional users identifying the section of the digital magazine, identifying an authorization to modify content included in the section of the digital magazine, and identifying the user of the digital magazine server from whom the request to create the section of the digital magazine was received;

receiving a modification to a content item included in the section of the digital magazine from an additional user of the plurality of additional users;

generating the section of the digital magazine including the modification to the content item from the additional user and one or more content items identified by the user by the digital magazine server computing scores for the one or more content items identified by the user and for the content item received from the additional user, the digital magazine server selecting a set of the one or more content items identified by the user and the additional content item based on the ranking, scoring page templates stored by the digital magazine server based on characteristics of slots in each of at least a set of page templates stored by the digital magazine server and characteristics of each of the set of the one or more content items identified by the user and the additional content item, selecting a page template stored by the digital magazine server specifying positions of each of the set of the one or more content items identified by the user and the additional content item relative to each other based on the scoring, and the digital magazine server presenting the one or more content items and the additional content item in positions relative to each other specified by the selected page template in the section based on the ranking; and presenting the section of the digital magazine including information identifying the additional user in conjunction with the content item including the modification received from the additional user and information identifying the user as associated with the section of the digital magazine to one or more other users of the digital magazine server.

4. The method of claim 3, wherein the modification to the content item comprises specifying a comment associated with the content item.

5. The method of claim 3, wherein the modification to the content item comprises altering information included in the content item.

6. A method for generating a digital magazine, the method comprising:
- receiving a request to create a section of the digital magazine from a user of a digital magazine server at the digital magazine server, the request including a location and a threshold distance from the location;
- receiving, at the digital magazine server, location information associated with one or more users of the digital magazine server;
- identifying, by the digital magazine server, one or more users associated with location information stored by the digital magazine server within the threshold distance included in the request of the location included in the request as additional users of the digital magazine server authorized by the user to modify content included in the section of the digital magazine;
- presenting an indication to each of the additional users identifying the section of the digital magazine, identifying an authorization to modify content included in the section of the digital magazine, and identifying the user of the digital magazine server from whom the request to create the section of the digital magazine was received;
- receiving a modification to content included in the section of the digital magazine from an additional user of the plurality of additional users;
- generating the section of the digital magazine including content based at least in part on the received modification by the digital magazine server computing scores for the one or more content items identified by the user and for the content item received from the additional user, the digital magazine server ranking the content items identified by the user and the content items received from the ranking based on the scores, the digital magazine server selecting a set of the one or more content items identified by the user and the additional content item based on the ranking, scoring page templates stored by the digital magazine server based on characteristics of slots in each of at least a set of page templates stored by the digital magazine server and characteristics of each of the set of the one or more content items identified by the user and the additional content item, selecting a page template stored by the digital magazine server specifying positions of each of the set of the one or more content items identified by the user and the additional content item relative to each other based on the scoring, and the digital magazine server presenting the one or more content items and the additional content items in positions relative to each other specified by the selected page template in the section based on the ranking; and
- presenting the section of the digital magazine including information identifying the additional user in conjunction with the content item including the modification received from the additional user and information identifying the user as associated with the section of the digital magazine to one or more other users of the digital magazine server.

7. The method of claim 6, wherein the modification to the content included in the section of the digital magazine comprises specifying a comment associated with a content item included in the section of the digital magazine.

8. The method of claim 6, wherein the modification to the content included in the section of the digital magazine comprises altering information included in a content item included in the section of the digital magazine.

9. The method of claim 6, wherein modification to the content included in the section of the digital magazine comprises identifying a content item for inclusion in the section of the digital magazine.

\* \* \* \* \*